(12) United States Patent
Huang

(10) Patent No.: US 7,650,904 B2
(45) Date of Patent: Jan. 26, 2010

(54) PRESSURE-REGULATING VALVE WITH AN INTEGRATED PRESSURE GAUGE

(76) Inventor: Yung-Chao Huang, 20F, No. 29, Sec. 2, Chungcheng E. Rd., Tamshui Chen, Taipei Hsien (TW)

( * ) Notice: Subject to any disclaimer, the term of this patent is extended or adjusted under 35 U.S.C. 154(b) by 397 days.

(21) Appl. No.: 11/826,013

(22) Filed: Jul. 11, 2007

(65) Prior Publication Data
US 2009/0014073 A1     Jan. 15, 2009

(51) Int. Cl.
*G05D 16/10* (2006.01)
(52) U.S. Cl. ............... 137/505.18; 137/505.41; 137/505.42; 137/557
(58) Field of Classification Search .......... 137/505.41, 137/505.42, 505.18, 557
See application file for complete search history.

(56) References Cited

U.S. PATENT DOCUMENTS

| | | | | |
|---|---|---|---|---|
| 3,035,608 A | * | 5/1962 | Ray ................... | 137/505.41 |
| 3,250,292 A | * | 5/1966 | Mollick ............... | 137/505.28 |
| 4,719,940 A | * | 1/1988 | Beavers .............. | 137/505.39 |
| 6,009,900 A | * | 1/2000 | Elgert et al. .......... | 137/557 |
| 6,182,692 B1 | * | 2/2001 | Fischer et al. ........ | 137/557 |
| 6,283,146 B1 | * | 9/2001 | Okitsu ................ | 137/505.26 |

\* cited by examiner

*Primary Examiner*—Stephen Hepperle
(74) *Attorney, Agent, or Firm*—Muncy, Geissler, Olds & Lowe, PLLC

(57) ABSTRACT

A pressure-regulating valve with an integrated pressure gauge has a body, an inlet nipple, a pressure-control device and a knob assembly. The body is tubular and has an inlet opening, an outlet and an adjustment end. The inlet nipple is connected to the inlet opening of the body and connects to a compressor. The outlet is a tube formed on the body and connects to a pneumatic tool or the like. The pressure-control device is movably placed inside the body and controls pressure of a gas flowing from the compressor to the outlet of the body. The knob assembly is rotatably mounted on the adjustment end of the body, is connected to the pressure-control device and displays and controls the pressure of the gas flowing from the compressor.

12 Claims, 5 Drawing Sheets

PRESSURE-REGULATING VALVE WITH AN INTEGRATED PRESSURE GAUGE

BACKGROUND OF THE INVENTION

1. Field of Invention

The present invention relates to a pressure-regulating valve, and more particularly to a pressure-regulating valve with an integrated pressure gauge.

2. Description of the Related Art

With reference to FIG. 5, a conventional pressure-regulating valve (81) is connected between an outlet of a compressor (82) and an inlet (88) of a pneumatic tool and regulates pressure of a gas flowing from the compressor (82) to the inlet (88) of the pneumatic tool. Moreover, a pressure gauge (83) necessarily has to be installed between the conventional pressure-regulating valve (81) and the inlet (88) of the pneumatic tool for displaying actual gas pressure to the pneumatic tool, so the gas pressure can be adjusted precisely. However, installing a pressure gauge (83) on a conventional pressure valve (81) is complicated and troublesome.

The present invention provides a pressure-regulating valve with an integrated pressure gauge to obviate or mitigate the shortcomings of the conventional pressure valve.

SUMMARY OF THE INVENTION

The primary objective of the present invention is to provide a pressure-regulating valve with an integrated pressure gauge that is easy to install.

The pressure-regulating valve with an integrated pressure gauge has a body, an inlet nipple, a pressure-control device and a knob assembly. The body is tubular and has an inlet opening, an outlet and an adjustment end. The inlet nipple is connected to the inlet opening and connects to a compressor. The outlet is a tube formed on the body and connects to a pneumatic tool or the like. The pressure-control device is movably mounted inside the body and controls pressure of a gas flowing from the compressor to the outlet of the body. The knob assembly is rotatably mounted on the adjustment end of the body, is connected with the pressure-control device and displays and controls the pressure of the gas flowing from the compressor.

Other objectives, advantages and novel features of the invention will become more apparent from the following detailed description when taken in conjunction with the accompanying drawings.

DETAILED DESCRIPTION OF THE INVENTION

Figure 1:
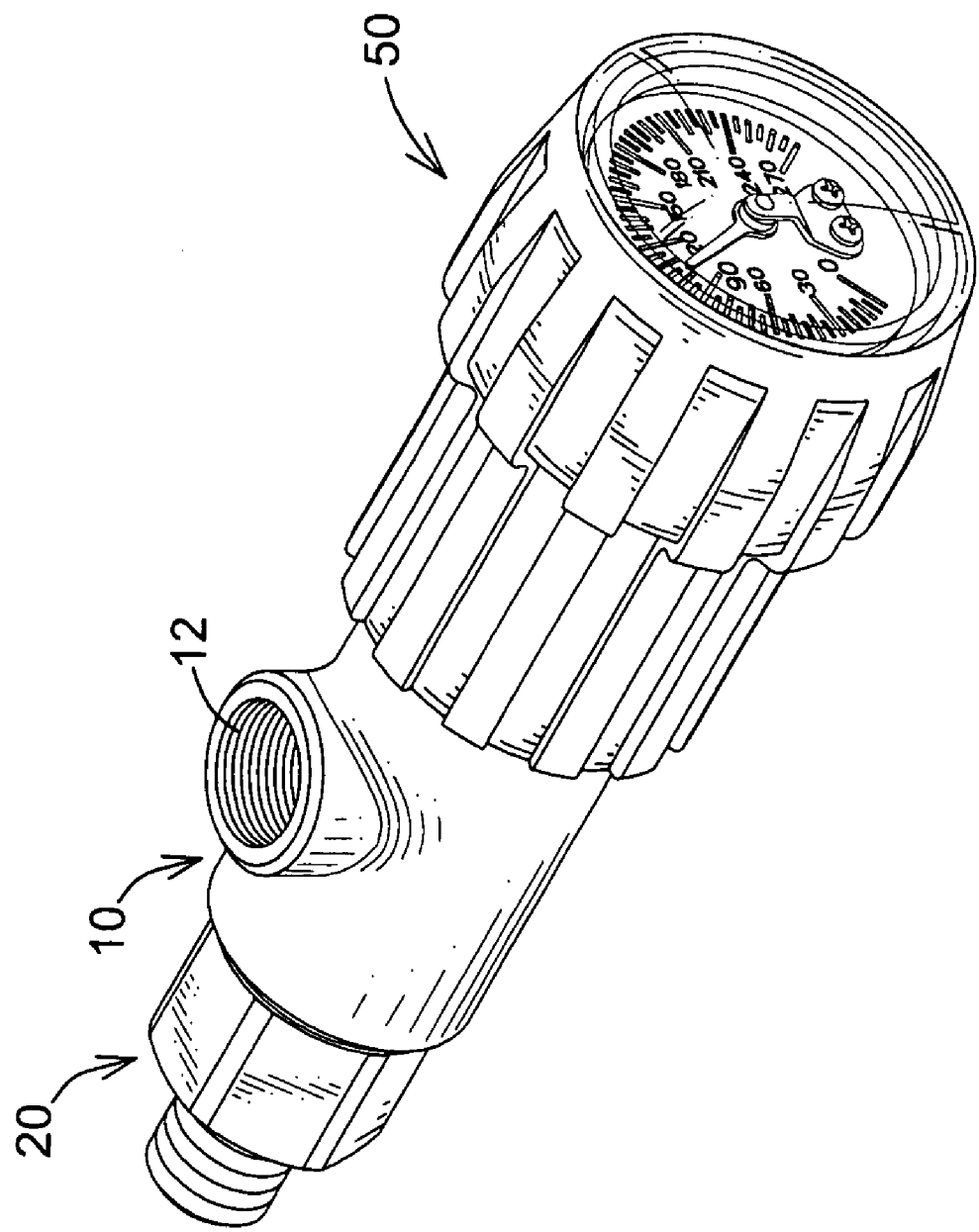
FIG. 1 is a perspective view of a pressure-regulating valve with an integrated pressure gauge in accordance of the present invention.
Figure 2:
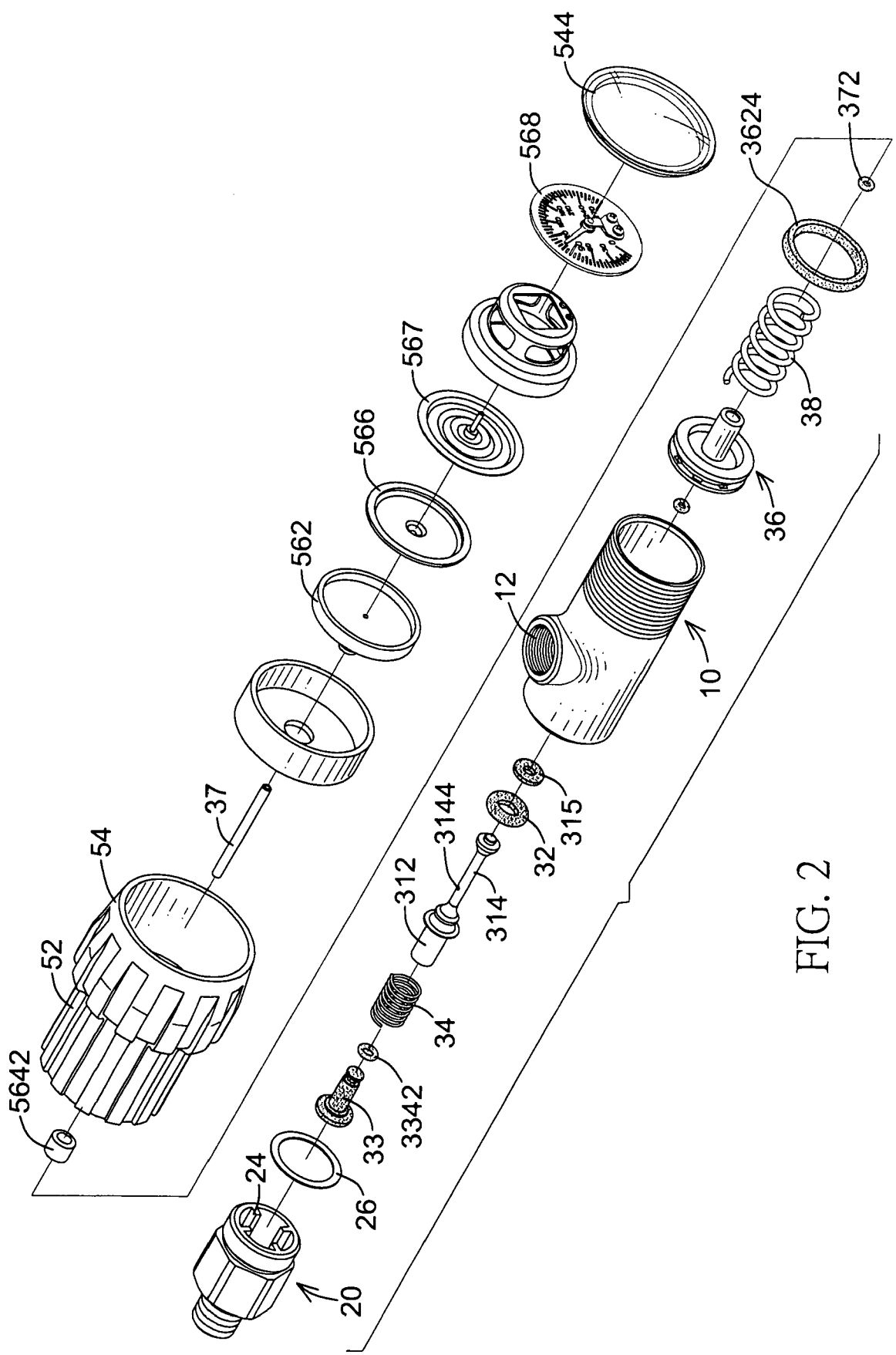
FIG. 2 is an exploded perspective view of the valve in FIG. 1.
Figure 3:
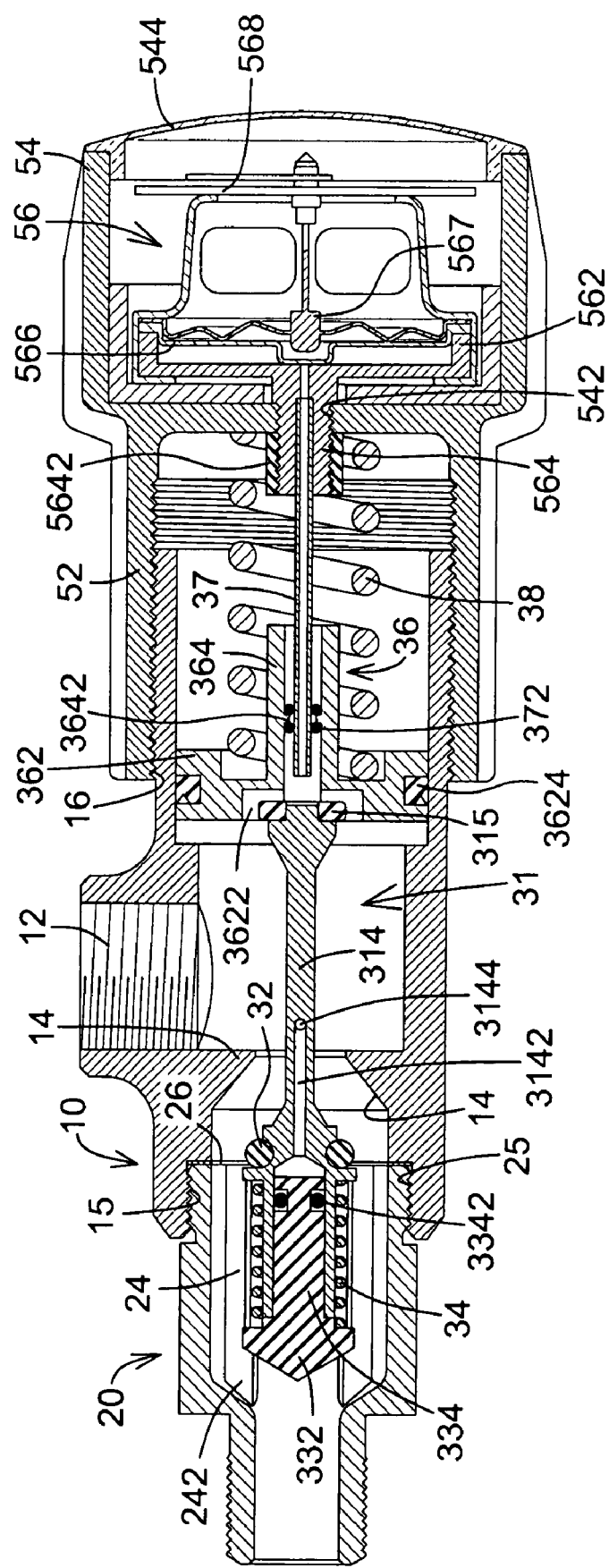
FIG. 3 is a side view in partial section of the valve in FIG. 1.
Figure 4:
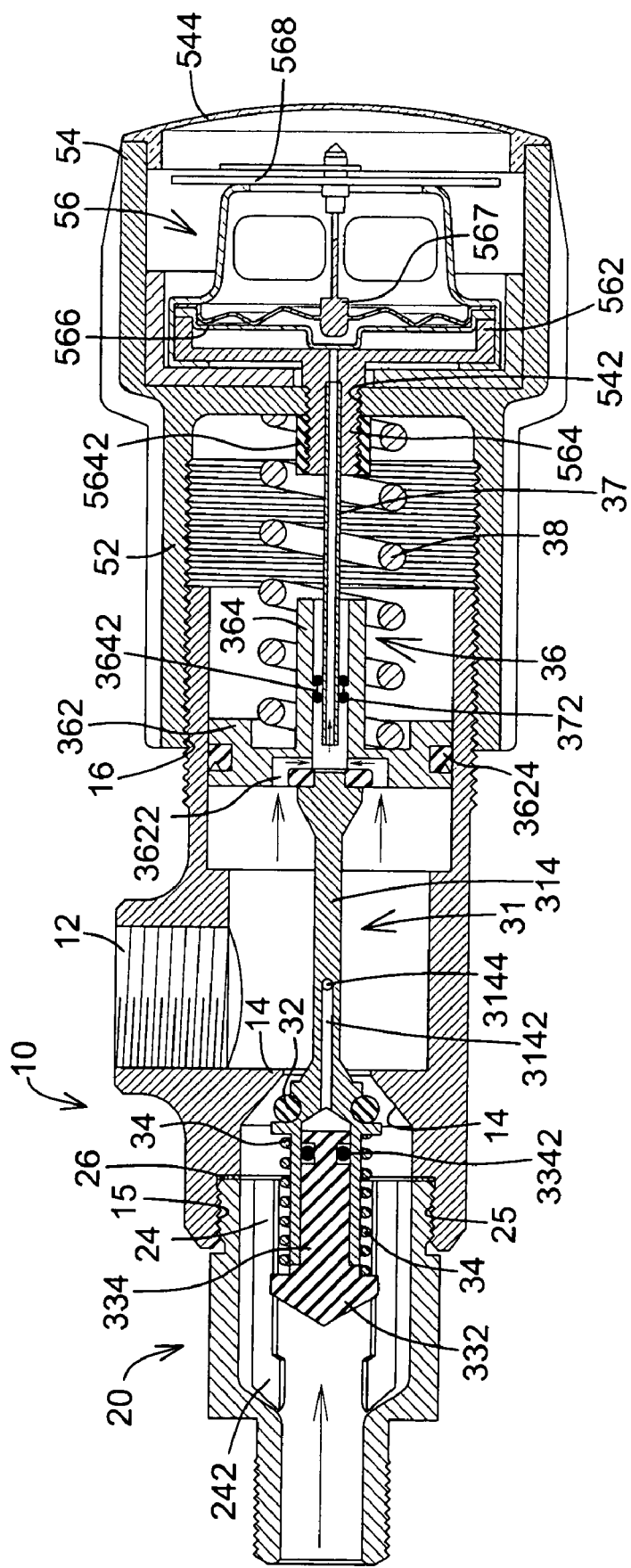
FIG. 4 is a using side view in partial section of the valve in FIG. 1.
Figure 5:
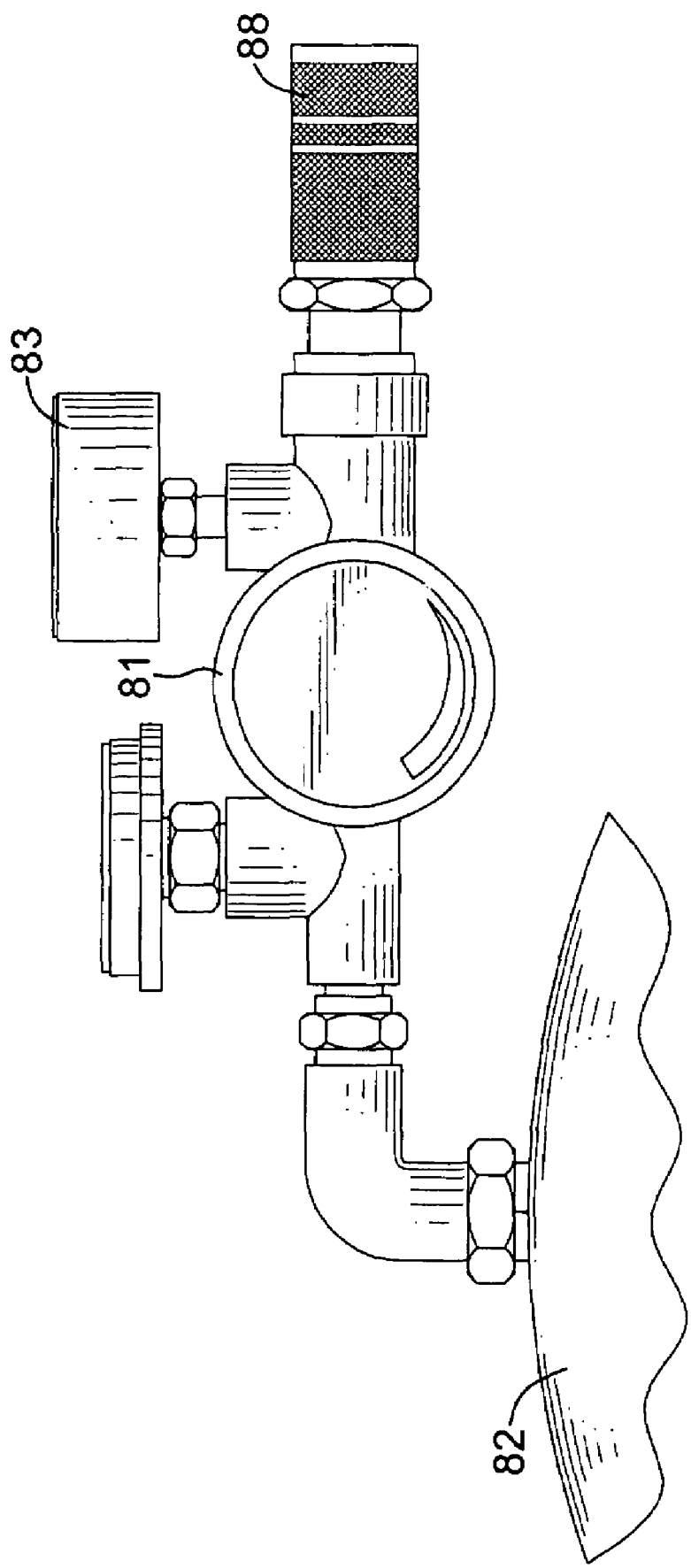
FIG. 5 is an operation side view of a conventional pressure-regulating valve and a conventional pressure gauge in accordance with a prior art.

With reference to FIGS. 1, 2, 3 and 4a pressure-regulating valve with an integrated pressure gauge in accordance with the present invention comprises a body (10), an inlet nipple (20), a pressure-control device (30) and a knob assembly (50).

The body (10) is tubular, may be straight, L-shaped or T-shaped and has a proximal end, a distal end, an inlet opening, an adjustment opening, an inner chamber, an outer surface, an outlet (12), a seat (14), an optional internal thread (15) and an optional external thread (16).

The inlet opening is formed in the proximal end.

The adjustment opening is formed in the distal end.

The inner chamber has a narrow chamber and a wide chamber. The narrow chamber communicates with the inlet opening. The wide chamber communicates with the narrow chamber and the adjustment opening.

The outlet (12) is a short tube, is formed on and protrudes from the outer surface of the body (10), communicates with the narrow chamber and may connects to a pneumatic tool.

The seat (14) is formed on and protrudes in from the inner surface of the body (10) between the inlet opening and the outlet (12).

The internal thread (15) is formed on the inner surface of the body (10) near the inlet opening.

The external thread (16) is formed on the outer surface of the body (10) near the adjustment opening.

The inlet nipple (20) is tubular, is connected to the body (10) and has a distal end, a proximal end, an inner surface, an outer surface, multiple sliding tabs (24), an optional proximal thread (25) and an optional gasket (26). The distal end of the inlet nipple (20) is open and connects to a compressor or an air source. Normally, gas flows from the compressor or the air source at a high pressure. The proximal end of the inlet nipple (20) is mounted in the inlet opening of the body (10).

The multiple sliding tabs (24) are formed longitudinally on the inner surface of the inlet nipple (20), and each sliding tab (24) has a thick end (242). The thick end (242) is near the distal end of the inlet nipple (20).

The proximal thread (25) is formed on the outer surface of the inlet nipple (20) near the proximal end and corresponds to and screws into the internal thread (15) of the body (10).

The gasket (26) is mounted between the inlet nipple (20) and the body (10).

The pressure-control device (30) is mounted inside the body (10) and has a push rod (31), a pressure-control O-ring (32), a pressure-regulating disk (33), an optional plug spring (34), a piston (36), an optional gas tube (37) and an optional balance spring (38).

The push rod (31) is straight and has a gas cavity (312), an extension rod (314) and an optional O-ring (315). The gas cavity (312) is tubular, is larger than the seat (14), is mounted slidably in the inlet nipple (20) between the sliding tabs (24), slides smoothly between the multiple sliding tabs (24) and has a distal end, a proximal end, an open end and an inner space. The proximal end of the gas cavity (312) corresponds to and is larger than the seat (14).

The extension rod (314) is smaller than the seat (14) and has a proximal end, a distal end, an optional gas path (3142) and an optional hole (3144). The proximal end of the extension rod (314) is connected to the proximal end of the gas cavity (312). The distal end of the extension rod (314) extends through the seat (14) into the wide chamber of the body (10). The gas path (3142) is formed longitudinally inside the extension rod (314) and has an outer end, an inner space and an inner end. The outer end is formed coaxially in the proximal end of the extension rod (314) and communicates with the inner space of the gas cavity (312). The inner space of the gas path (3142) communicates with the inner space of the gas cavity (312) through the outer end of the gas path (3142). The hole (3144) is formed transversely through the extension rod (314), corresponds to the outlet (12) and communicates with the inner end of the gas path (3142). The O-ring (315) is mounted around the extension rod (314) near the distal end.

The pressure-control O-ring (32) is mounted around the proximal end of the gas cavity (312), is larger than the seat (14) and isolates the inlet opening from the outlet (12) when the pressure-control O-ring presses against the seat (14).

The pressure-regulating disk (33) is mounted slidably in and protrudes from the gas cavity (312), is movably mounted between the sliding tabs (24) and has a disk (332) and a shaft (334).

The disk (332) is conical and has a conical surface and a bottom. The disk (332) is larger than the gas cavity (312), slides smoothly between the sliding tabs (24) and is limited by the thick ends (242) when the conical surface touches the thick ends (242) so gas from the compressor flows into the inlet nipple (20) and the body (10).

The shaft (334) is formed coaxially on and protrudes from the bottom of the disk (332), corresponds to and is slidably mounted in the inner space of the gas cavity (312) and has a distal end, an optional annular groove and an optional O-ring (3342). The annular groove is formed around the shaft (334) near the distal end. The O-ring (3342) is mounted in the annular groove.

The plug spring (34) is mounted around the gas cavity (312) between the proximal end of the gas cavity 312) and the bottom of the disk (332) and provides a force against gas flowing from the compressor.

When high pressure gas from the compressor flows through the seat (14) into the body (10), gas pressure outside the hole (3144) is a little higher than gas pressure at the inlet nipple (20) so a stabilizing gas flows into the gas path (3142) and the gas cavity (312) through the hole (3144). The pressure-regulating disk (33) is pushed slightly out of the gas cavity (312), so that the proximal end of the gas cavity (312) moves closer to the seat (14) and restricts gas flowing to the outlet (12) and stabilizes a pressure of the gas flows to the outlet (12).

The piston (36) is mounted slidably inside the wide chamber of the body (10) and has a head (362) and a rod (364).

The head (362) corresponds to and is mounted slidably in the inner surface of the wide chamber of the body (10) and has a front surface, a rear surface, a sidewall, a piston seal (3624), an optional recess and at least one piston gas path (3622). The sidewall has a groove. The groove is formed around the sidewall. The piston seal (3624) corresponds to and is mounted in the groove. The recess is formed coaxially in the front surface and corresponds to and holds the distal end of the extension rod (314). The O-ring (315) is mounted around the extension rod (314) near the distal end and in the recess in the head (362). The piston gas path (3622) is formed through the head (362), communicates with the inner space of the body (10) and has an input opening. The input opening is formed on the front surface of the head (362) and communicates with the inner space of the body (10).

The rod (364) is formed coaxially on and protrudes from the rear surface of the head (362), has an inner space, a proximal end, a distal end, an inner surface and an optional annular rib (3642). The inner space of the rod (364) communicates with the piston gas path (3622). The proximal end of the piston tube (364) is mounted coaxially on the rear surface of the head (362). The annular rib (3642) is formed on and protrudes in from the inner surface of the rod (364).

The gas tube (37) is straight, is mounted in the inner space of the rod (364) of the piston (36) and has a proximal end, a distal end and two mounting O-rings (372). The proximal end of the gas tube (37) is mounted in the inner space of the rod (364) through the distal end of the rod (364). The distal end of the gas tube (37) extends from the adjustment end of the body (10). The mounting O-rings (372) are mounted around the gas tube (37) adjacent to the annular rib (3642) and hold the gas tube (37) in position inside the rod (364).

The balance spring (38) is mounted around the rod (364) and the gas tube (37) against the rear surface of the head (362) and has an outer end.

The knob assembly (50) has a knob (52), a pressure gauge seat (54) and a pressure gauge (56). The knob (52) is mounted rotatably on the adjustment end of the body (10) and has an inner surface and an optional internal thread. The internal thread is formed on the inner surface and screws onto the external thread (16) on the adjustment end of the body (10). The pressure gauge seat (54) may be a round tube, is mounted in the knob (52) and has a connecting surface, a connecting hole (542) and a display surface (544). The connecting surface connects to the knob (52) and has a center. The connecting hole (542) is formed transversely through the center of the connecting surface. The display surface (544) is transparent, is formed on the pressure gauge seat (54) and corresponds to the connecting surface of the pressure gauge seat (54).

The pressure gauge (56) is a gas pressure reading and displaying device, may be digital or analog, being mounted on the rod (364) in the pressure gauge seat (54), corresponds to the display surface (544), shows gas pressure inside the body (10) and may rotatably seal the rod (364) directly or may be connect to the gas tube (37). In a first embodiment of the present invention, the pressure gauge (56) is connected to the gas tube (37), is an analog gas pressure reading and displaying device mounted inside the pressure gauge seat (54) and has a gauge base (562), a gauge gas inlet (564), an elastic film (566), a pusher (567) and an indicator (568).

The gauge base (562) is a round substrate, is mounted on the connecting surface of the pressure gauge seat (54) and has a center and an edge.

The gauge gas inlet (564) is a tube with two open ends and has a proximal end, a distal end and a mounting ring (5642). The proximal end of the gauge gas inlet (564) is formed transversely on the center of the gauge base (562). The distal end of the gauge gas inlet (564) extends into the knob (52) through the connecting hole (542). Moreover, the gauge gas inlet (564) may seal the rod (364) directly or attach to the gas tube (37) when the distal end of the gas tube (37) extends into the gauge gas inlet (564) through the distal end of the gauge gas inlet (564). The mounting ring (5642) attaches to the distal end of the gauge gas inlet (564) and holds the gauge base (562) on the connecting surface of the pressure gauge seat (54).

The elastic film (566) has an edge being sealed with the edge of the gauge base (562) and defining a pressure reading space between the elastic film (566) and the gauge base (562). The pressure reading space will become larger when gas flows from the compressor into the body (10), so that the elastic film (566) will separate from the gauge base (562).

The pusher (567) has a base and a push rod. The base has a center and an edge. The edge of the base of the pusher (567) is sealed with the edge of the gauge base (564). The push rod has a proximal end and a distal end. The proximal end of the push rod of the pusher (567) is formed on the center of the base of the pusher (567) and is pushed toward the display surface (544).

The indicator (568) is mounted inside the pressure gauge seat (54), corresponds to the display surface (544), is connected to the distal end of the push rod of the pusher (567) and indicates gas pressure inside the body (10) when the pusher (567) is pushed by the elastic film (566).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A pressure-regulating valve with an integrated pressure gauge comprises
   a body being tubular and having
      a proximal end;
      a distal end;
      an inlet opening being formed on the proximal end;
      an adjustment opening being formed on the distal end;
      an inner chamber having
         a narrow chamber communicating with the inlet opening; and
         a wide chamber communicating with the narrow chamber and the adjustment opening;
      an outer surface;
      an outlet being a short tube, being formed on and protruding from the outer surface of the body, communicating with the narrow chamber; and
      a seat being formed on and protruding in form the inner surface of the body between the inlet opening and the outlet;
   an inlet nipple being tubular, being connected to the body and having
      a distal end being open;
      a proximal end being mounted in the inlet opening of the body;
      an inner surface;
      an outer surface; and
      multiple sliding tabs being formed longitudinally on the inner surface of the inlet nipple, and each sliding tab having a thick end being near the distal end of the inlet nipple;
   a pressure-control device being movably mounted inside the body and having
      a push rod being straight and having
         a gas cavity being tubular, being partially larger than the seat, being mounted slidably in the inlet nipple between the sliding tabs, sliding smoothly between the sliding tabs and having
            a distal end;
            a proximal end corresponding to and being larger than the seat;
            an open end; and
            an inner space; and
         an extension rod being smaller than the seat and having
            a proximal end being connected to the proximal end of the gas cavity; and
            a distal end extending through the seat into the wide chamber of the body;
      a pressure-control O-ring being mounted around the proximal end of the gas cavity and being larger than the seat;
      a pressure-regulating disk being mounted slidably in and protruding from the gas cavity, being movably mounted between the sliding tabs and having
         a disk being conical, being movably mounted between the sliding tabs, being larger than the gas cavity and having
            a conical surface; and
            a bottom; and
         a shaft being formed coaxially on and protruding from the bottom of the disk, corresponding to and being slidably mounted in the inner space of the gas cavity, and having a distal end; and
      a piston being mounted slidably inside the wide chamber of the body and having
         a head corresponding to and being mounted slidably in the inner surface of the wide chamber of the body and having
            a front surface;
            a rear surface;
            a sidewall having a groove being formed around the sidewall;
            a piston seal corresponding to and being mounted in the groove in the sidewall; and
            at least one piston gas path being formed through the head and having an input opening being formed on the front surface of the head and communicating with the inner space of the body; and
         a rod being formed coaxially on and protruding from the rear surface of the head and having
            an inner space communicating with the piston gas path;
            a proximal end is mounted coaxially on the rear surface of the head;
            a distal end; and
            an inner surface; and
   a knob assembly having
      a knob being mounted rotatably on the adjustment end of the body and having an inner surface;
      a pressure gauge seat being mounted in the knob and having
         a connecting surface connecting to the knob and having a center;
         a connecting hole being formed transversely through the center of the connecting surface; and
         a display surface being transparent, being formed on the pressure gauge seat corresponding to the connecting surface of the pressure gauge seat; and
      a pressure gauge being a gas pressure reading and displaying device, being mounted on the rod in the pressure gauge seat, corresponding to the display surface and showing gas pressure inside the body.

2. The pressure-regulating valve as claimed in claim 1, wherein
   the body has
      an internal thread being formed on the inner surface of the body near the inlet opening; and
      an external thread being formed on the outer surface of the body near the adjustment end;
   the inlet nipple further has a proximal thread being formed on the outer surface of the inlet nipple near the proximal end and corresponding to and screwing into the internal thread of the body; and
   the knob further has an internal thread being formed on the inner surface and screwing onto the external thread on the adjustment end of the body.

3. The pressure-regulating valve as claimed in claim 1, wherein the body is straight.

4. The pressure-regulating valve as claimed in claim 1, wherein the body is T-shaped.

5. The pressure-regulating valve as claimed in claim 1, wherein
   the rod further has an annular rib being formed on and protruding in from the inner surface of the rod; and the pressure-control device further has a gas tube being
straight, being mounted in the inner space of the rod of
the piston and having
- a proximal end being mounted in the inner space of the
  rod through the distal end of the rod;
- a distal end extending from the adjustment end of the
  body; and
- two mounting O-rings being mounted around the gas
  tube adjacent to the annular rib and holding the gas
  tube in position inside the rod.

6. The pressure-regulating valve as claimed in claim 1, wherein the head further has a recess being formed coaxially in the front surface and corresponding to and holding the distal end of the extension rod.

7. The pressure-regulating valve as claimed in claim 1, the extension rod further has
- a gas path being formed longitudinally inside the extension rod and having
  - an outer end being formed coaxially in the proximal end of the extension rod and communicating with the inner space of the gas cavity;
  - an inner space communicating with the inner space of the gas cavity through the outer end of the gas path; and
  - an inner end; and
- a hole being formed transversely through the extension rod, corresponding to the outlet of the body communicating with the inner end of the gas path.

8. The pressure-regulating valve as claimed in claim 1, wherein the shaft further has
- an annular groove being formed around the shaft near the distal end; and
- an O-ring being mounted in the annular groove.

9. The pressure-regulating valve as claimed in claim 2, wherein the inlet nipple further has a gasket being mounted between the inlet nipple and the body.

10. The pressure-regulating valve as claimed in claim 5, wherein the pressure-control device further has
- a plug spring being mounted around the gas cavity between the proximal end of the gas cavity and the bottom of the disk; and
- a balance spring being mounted around the rod and the gas tube against the rear surface of the head and having an outer end.

11. The pressure-regulating valve as claimed in claim 6, wherein the push rod further has an O-ring mounted around the extension rod near the distal end and in the recess of the head.

12. The pressure-regulating valve as claimed in claim 10, wherein the pressure gauge is an analog gas pressure reading and displaying device and has
- a gauge base being a round substrate, being mounted on the connecting surface of the pressure gauge seat and having a center and a edge;
- a gauge gas inlet being a tube with two open ends and having
  - a proximal end being formed transversely on the center of the gauge base;
  - a distal end extending into the knob through the connecting hole of the pressure gauge seat; and
  - a mounting ring attaching to the distal end of the gauge gas inlet and holding the gauge base on the connecting surface of the pressure gauge seat;
- an elastic film having an edge being sealed with the edge of the gauge base;
- a pusher having
  - a base having
    - a center; and
    - an edge being sealed with the edge of the gauge base; and
  - a push rod having
    - a proximal end being formed on the center of the base of the pusher; and
    - a distal end; and
- an indicator being mounted inside the pressure gauge seat, corresponding to the display surface, being connected to the distal end of the push rod of the pusher and indicating gas pressure inside the body when the pusher is pushed by the elastic film.

* * * * *